United States Patent
Mori

[11] Patent Number: 6,105,116
[45] Date of Patent: Aug. 15, 2000

[54] METHOD AND APPARATUS OF CONTROLLING A DISK CACHE DURING A DEGENERATED MODE OF OPERATION

[75] Inventor: Yoshiaki Mori, Tokyo, Japan

[73] Assignee: NEC Corporation, Tokyo, Japan

[21] Appl. No.: 08/996,813

[22] Filed: Dec. 23, 1997

[30] Foreign Application Priority Data

Jan. 6, 1997 [JP] Japan .................................. 9-011815

[51] Int. Cl.⁷ ...................................................... G06F 12/16
[52] U.S. Cl. ................................ 711/162; 711/113; 714/6
[58] Field of Search ................................. 711/112, 113, 711/114, 161, 162; 714/5, 6

[56] References Cited

U.S. PATENT DOCUMENTS

| | | | |
|---|---|---|---|
| 5,390,186 | 2/1995 | Murata et al. | 711/113 |
| 5,396,596 | 3/1995 | Hashemi et al. | 711/113 |
| 5,548,711 | 8/1996 | Brant et al. | 714/5 |
| 5,553,263 | 9/1996 | Kalish et al. | 711/127 |
| 5,617,530 | 4/1997 | Stallmo et al. | 714/6 |
| 5,689,729 | 11/1997 | Inoue | 710/52 |

FOREIGN PATENT DOCUMENTS

| | | |
|---|---|---|
| 057601 | 3/1988 | Japan . |
| 050624 | 3/1989 | Japan . |
| 111056 | 4/1989 | Japan . |
| 318219 | 12/1989 | Japan . |
| 071509 | 3/1990 | Japan . |
| 269018 | 10/1990 | Japan . |
| 285995 | 10/1991 | Japan . |
| 195032 | 7/1992 | Japan . |
| 249724 | 9/1992 | Japan . |
| 256216 | 10/1993 | Japan . |
| 304939 | 12/1993 | Japan . |
| 199501 | 8/1994 | Japan . |
| 7-110788 | 4/1995 | Japan . |
| 8-328758 | 12/1996 | Japan . |

*Primary Examiner*—Eddie P. Chan
*Assistant Examiner*—Kevin L. Ellis
*Attorney, Agent, or Firm*—Sughrue, Mion, Zinn, Macpeak & Seas, PLLC

[57] ABSTRACT

A disk cache is controlled to continue duel data writing even during a degenerated mode of operation due to a failure of a cache memory, and also to continue a FAST WRITE process while maintaining reliability for thereby avoiding a drop in performance. If a memory module MM#1 fails, processing of dirty data 111 stored in the memory module MM#1 is continued using backup data 122 stored in a memory module MM#2 for the dirty data 111 stored in the memory module MM#1. The backup data 122 stored in the memory module MM#2 for the dirty data 111 stored in the memory module MM#1 is copied to a memory module MM#3, generating backup data 111' for the dirty data 111. Then, dirty data 131 stored in the memory module MM#3 is copied to the memory module MM#2, generating backup data 112' for the dirty data 131 stored in the memory module MM#3, instead of backup data 112 stored in the memory module MM#1.

60 Claims, 12 Drawing Sheets

FIG. 2
PRIOR ART
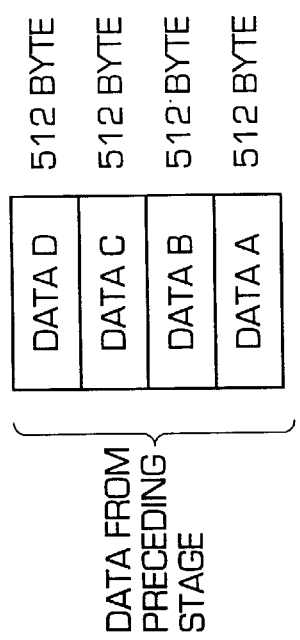
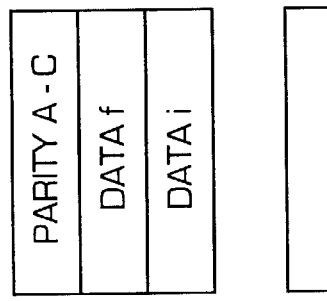
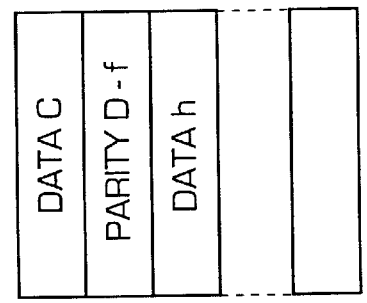
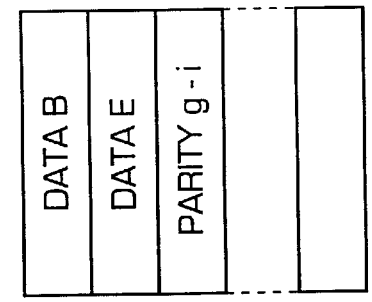
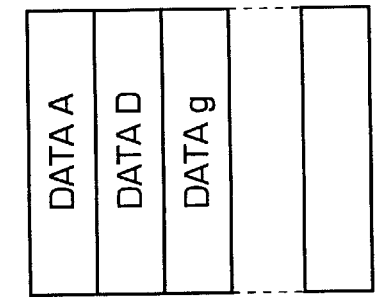

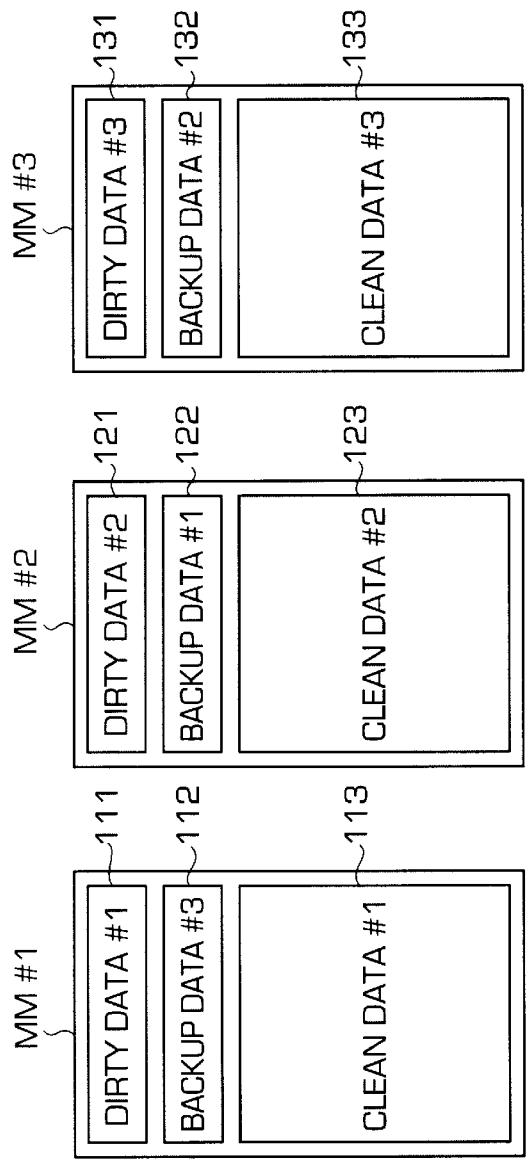
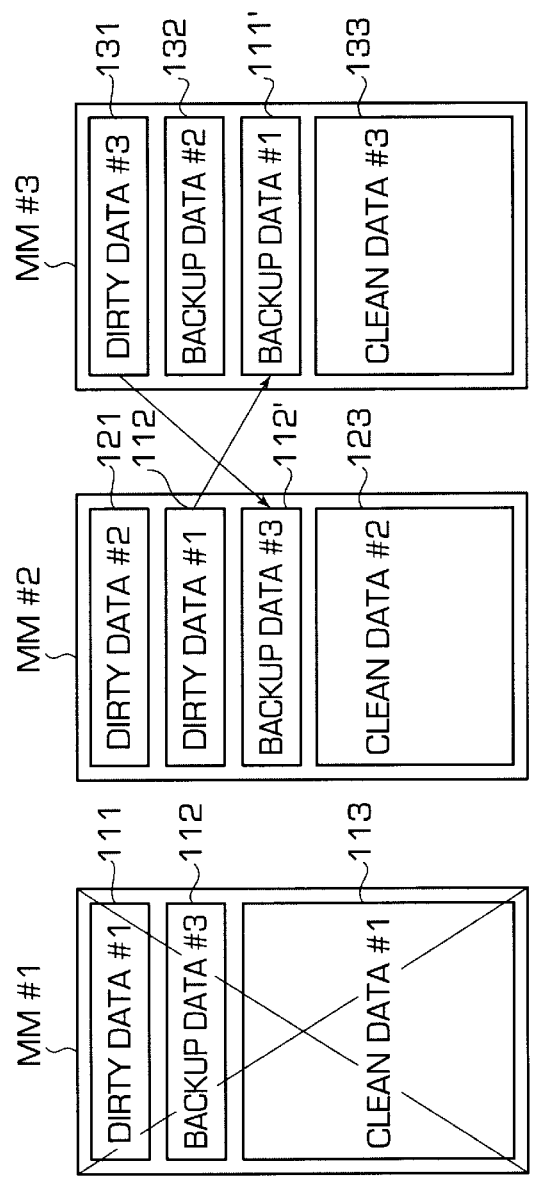
FIG. 3(a)
FIG. 3(b)

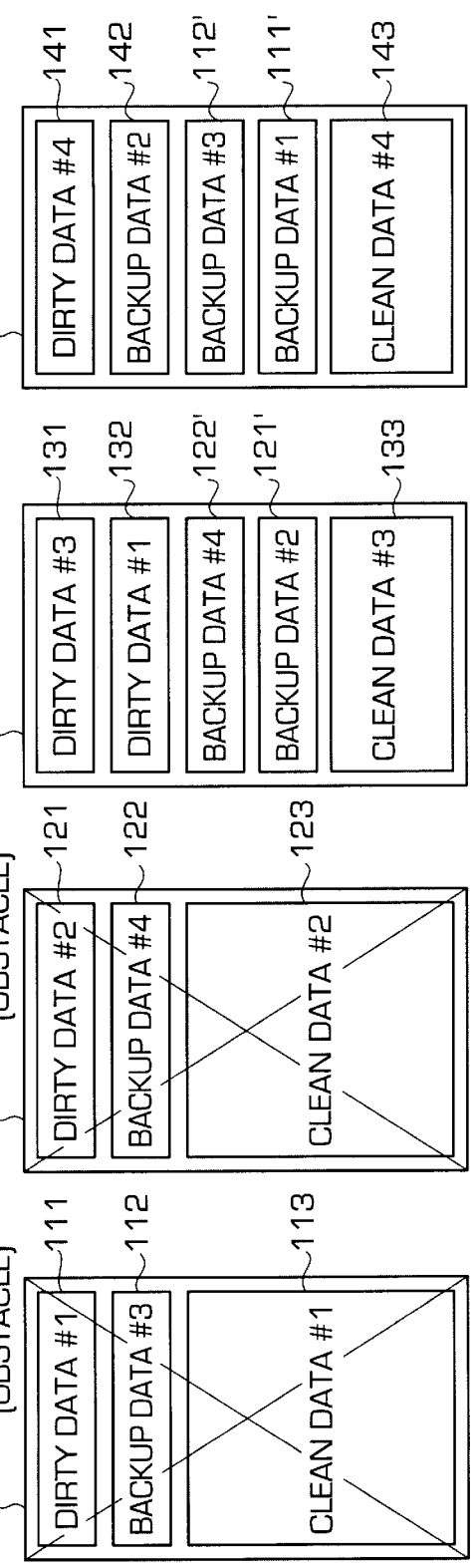
FIG. 4(a) NORMAL STATE
FIG. 4(b) ABNORMAL STATE

METHOD AND APPARATUS OF CONTROLLING A DISK CACHE DURING A DEGENERATED MODE OF OPERATION

BACKGROUND OF THE INVENTION

1. Field of the Invention

The present invention relates to a method of controlling a disk cache, and more particularly to a method of controlling a disk cache to recover and continue memory data processing without loss of data when a cache memory suffers a failure.

2. Description of the Related Art

It is the general practice to use disk caches to increase speeds at which to access magnetic disks (hereinafter also referred to as disks).

In order to speed up a data writing process with a disk cache, a FAST WRITE process has also been frequently carried out by reporting an end of data storage to a preceding stage when the storage of data into the disk cache comes to an end and updating data on the disk at a later time. According to the FAST WRITE process, since an end of data storage is reported to the preceding stage when data to be written which has been delivered from the preceding stage is stored into the disk cache, backup data may be simultaneously generated, making a dual data system, so as to prevent non-updated data from being eliminated due to a fault before being written on the disk. With the dual data system, when one data system fails to operate, memory data processing is continued either by a degenerated arrangement with the other data system or by interrupting the FAST WRITE process for maintaining reliability.

FIG. 1(a) of the accompanying drawings schematically illustrates a conventional method of controlling a disc cache to make disc cache data triple with two memory modules MM#1, MM#2. In FIG. 1(a), the memory modules MM#1, MM#2 store non-updated data (hereinafter also referred to as dirty data) 111, 121 written on the memory modules according to a FAST WRITE command from a preceding stage, data 112, 122 (hereinafter referred to as backup data) for backing up the dirty data which have been written in the other memory modules, and data 113, 123 (hereinafter referred to as clean data) that are in conformity with data recorded on a disk. When a FAST WRITE command is issued from the preceding stage, data is written as dirty data in one of the memory modules and as backup data in the other memory module. When data is read from the disk, the data is stored as clean data in either one of the memory modules, and is not made dual. If one of the memory modules cannot be used due to a failure, then the dirty data and the backup data which have been stored in the other memory module are handled as dirty data, thus assuring all the non-updated data. Though the clean data stored in the memory module which is no longer usable due to the failure is eliminated, when the preceding stage is about to read the clean data, data is read from the disk again, and stored as clean data into the memory module which can be used. According to this method, no data loss occurs owing to a memory module fault, but no redundancy is available with respect to the non-updated data because of a failure of one of the memory modules.

FIG. 1b) illustrates a conventional method of controlling a disc cache to make disc cache data fully dual with two memory modules MM#1, MM#2. In FIG. 1b), the memory modules MM#1, MM#2 store dirty data 111 and backup data 122, respectively, and clean data 113, 123, respectively, that are in conformity with data recorded on a disk. When a FAST WRITE command is issued from a preceding stage, data is written as dirty data in one of the memory modules and as backup data in the other memory module. When data is read from the disk, the same operation as above is performed, making clean data dual. According to this method, if one of the memory modules suffers a failure, only the usable memory module is used to continue memory data processing. In this case, only half the memory capacity that is installed can be used under normal conditions.

A first problem with the conventional methods of controlling a disk cache is that if the cache memory data is made fully dual, the cost is high because there is required a memory capacity that is twice the capacity of the cache memory that is used.

A second problem is that even if cache memory data is made dual to provide redundancy, such redundancy will be lost when one of the memory modules fails, and the occurrence of a new failure will make the disk cache system unstable with possible loss of data. Therefore, after redundancy has been lost due to a failure, the user needs to select one of two alternatives, i.e., using the disk cache system in favor of performance knowing that the data may possible be lost upon occurrence of a new failure, and interrupting the FAST WRITE process in favor of reliability.

Recent years have seen a RAID (Redundant Arrays of Independent Disks) system which comprises a combination of plural physical disks. A RAID-5 disk system which has a disadvantage referred to as write penalty suffers a drop in performance when a FAST WRITE process is interrupted for reliability and an end of data writing is not reported to a preceding stage until the writing of data onto a disk is ended.

Briefly, the RAID system is a disk system which is viewed as a single disk from a preceding stage, but actually comprises a plurality of physical disks for storing distributed data with added redundant data. Several levels are defined for the RAID system. According to the RAID-5 level, data are stored in the disks by sector striping.

For example, as shown in FIG. 2 of the accompanying drawings, when 2048 bytes of data are sent from a preceding stage to a RAID system which comprises four physical disks each having a sector length of 512 bytes, the 2048 bytes of data are divided into as many blocks as an integral multiple of the sector length, and the blocks are distributed to different disks and written with parity data on those disks. In the example shown in FIG. 2, divided blocks of data A, B, C are distributed and written on three disks, and parity data A-C for the horizontally aligned blocks A, B, C of data (as viewed in FIG. 2) across those three disks is written on the remaining one disk. It is necessary that parity data should be written on one disk to hold parity for the horizontally aligned blocks across the other three disks. Therefore, when a block D of data is written on one disk, parity data D-f needs to be updated in order to maintain consistency, according to either one of the following processes:

(1) Data e, f are read, parity data D-f is calculated from the data e, f, D, and the parity data D-f is written.

(2) Data d and parity data d-f which are present before the data D is written are read, the data d, the parity data d-f, (the data d and the parity data d-f), and the data D are exclusive-ORed into parity data D-f, and the parity data D-f is written.

According to these processes, in order to write the data D, it is necessary to update the parity data by reading data on the disks, regenerating parity data using the read data, and writing the parity data. Consequently, in order to write data whose size is smaller than a horizontal array of blocks, data needs to be read once from the disks, resulting in a processing time which is at least twice the time required to simply write data on the disks. Such a problem is referred to as write penalty and inherent in the RAID-5 level. This problem can be solved by the FAST WRITE process, which reports an end of data storage when the data D is stored in a cache memory and executes time-consuming disk accessing asynchronously with a host I/O. However, the FAST WRITE process is disadvantageous in that since an end of data storage is reported to a preceding stage before data is written on a disk, the data will be lost if a memory fault occurs before the data is actually written on the disk.

SUMMARY OF THE INVENTION

It is therefore an object of the present invention to provide a method of controlling a disk cache to continue duel data writing even during a degenerated mode of operation due to a failure of a cache memory, and also to continue a FAST WRITE process while maintaining reliability for thereby avoiding a drop in performance.

According to the present invention, there is provided a method of controlling a disk cache, comprising the steps of providing a disk cache having at least three physically independent memory modules, and distributing data over the memory modules to store, in each of the memory modules, clean data in conformity with data on a disk, dirty data as non-updated data, and backup data for non-updated data in another one of the memory modules.

The method comprises the steps of, if a first one of the memory modules suffers a failure and data stored in the first memory module is lost, continuously processing lost non-updated data in the first memory module, with backup data stored in a second one of the memory modules for the non-updated data in the first memory module, copying the backup data stored in the second the memory module for the non-updated data in the first memory module to a third one of the memory modules thereby to generate backup data for the lost non-updated data in the first memory module, and copying non-updated data in the third memory module to the second memory module to generate backup data stored in the first memory module for the non-updated data in the third memory module.

According to the present invention, there is also provided a method of controlling a disk cache, comprising the steps of providing a disk cache having three physically independent memory modules, specifying a logical disk number for which an I/O signal is issued from a preceding stage, determining the remainder of the division: logical disk number/3 as a storage memory module number, deciding whether a storage memory module is suffering a failure or not, if the storage memory module is suffering a failure, determining the remainder of the division: (logical disk number+1)/3 as a storage memory module number, selecting a storage memory module, deciding the need of generating backup data based on whether a FAST WRITE process is carried out or not, if the FAST WRITE process is carried out, determining the remainder of the division: (storage memory module number+1)/3 as a backup memory module number, selecting a backup memory module simultaneously with the storage memory module, and determining a storage position from cache directory information. The method comprises the steps of specifying the number of a memory module which is suffering a failure, changing a directory such that backup data stored in a memory module which is represented by the remainder of the division: (failure memory module number+1)/3 will be handled as dirty data, keeping an empty area having the same capacity as the dirty data in a memory module which is represented by the remainder of the division: failure memory module number+2)/3, copying the dirty data to the memory module which is represented by the remainder of the division: (failure memory module number+2)/3 thereby to generate backup data, keeping an empty area having the same capacity as the dirty data in the memory module which is represented by the remainder of the division: (failure memory module number+1)/3, and copying the dirty data to the memory module which is represented by the remainder of the division: (failure memory module number+1)/3 thereby to generate backup data.

According to the present invention, there is also provided a method of controlling a disk cache, comprising the steps of providing a disk cache having four physically independent memory modules, specifying a logical disk number for which an I/O signal is issued from a preceding stage, determining the remainder of the division: logical disk number/4 as a storage memory module number, deciding whether a storage memory module is suffering a failure or not, if the storage memory module is suffering a failure, determining the remainder of the division: (logical disk number+2)/4 as a storage memory module number, selecting a storage memory module, deciding the need of generating backup data based on whether a FAST WRITE process is carried out or not, if the FAST WRITE process is carried out, determining the remainder of the division: (storage memory module number+1)/4 as a backup memory module number, deciding whether a backup memory module is suffering a failure or not, if the backup memory module is suffering a failure, determining the remainder of the division: (storage memory module number+3)/4 as a backup memory module number, selecting a backup memory module simultaneously with the storage memory module, and determining a storage position from cache directory information. The method comprises the steps of specifying the number of a memory module which is suffering a failure, changing a directory such that backup data stored in a memory module which is represented by the remainder of the division: (failure memory module number+2)/4 will be handled as dirty data, selecting a memory module which is represented by the remainder of the division: (failure memory module number+3)/4, deciding whether the selected memory module is suffering a failure or not, if the selected memory module is not suffering a failure, establishing a memory module which is represented by the remainder of the division: (failure memory module number+3)/4 as a backup memory module, if the selected memory module is suffering a failure, establishing a memory module which is represented by the remainder of the division: (failure memory module number+5)/4 as a backup memory module, keeping an empty area having the same capacity as dirty data in the memory module which is represented by the remainder of the division: (failure memory module number+2)/4 in the established backup memory module, copying the dirty data in the memory module which is represented by the remainder of the division: (failure memory module number+2)/4 to the established backup memory module thereby generate backup data, keeping an empty area having the same capacity as dirty data in the memory module which is represented by the remainder of the division: (failure memory module number+2)/4 in the established backup memory module, copying the dirty data in the memory module which is represented by the remainder of the division: (failure memory module number+2)/4 to the established backup memory module thereby generate backup data, searching for a memory module, other than the established memory module, which is suffering a failure, but not recovered, deciding whether there is a memory module which is suffering a failure, but not recovered, and if there is a memory module which is suffering a failure, but not recovered, repeating the above steps.

According to the present invention, there is further provided a method of controlling a disk cache, comprising the steps of providing a disk cache having three physically independent memory modules, calculating an access area having a predetermined size from a logic disk number and a sector number for which an I/O signal is issued from a preceding stage, determining the remainder of the division: access area/3 as a storage memory module number, deciding whether a storage memory module is suffering a failure or not, if a storage memory module is suffering a failure, determining the remainder of the division: (access area+1)/3 as a storage memory module number, selecting a storage memory module, deciding the need of generating backup data based on whether a FAST WRITE process is carried out or not, if the FAST WRITE process is carried out, determining the remainder of the division: (storage memory module number+1)/3 as a backup memory module number, selecting a backup memory module simultaneously with the storage memory module, and determining a storage position from cache directory information.

According to the present invention, there is further provided a method of controlling a disk cache, comprising the steps of providing a disk cache having four physically independent memory modules, calculating an access area having a predetermined size from a logic disk number and a sector number for which an I/O signal is issued from a preceding stage, determining the remainder of the division: access area/4 as a storage memory module number, deciding whether a storage memory module is suffering a failure or not, if a storage memory module is suffering a failure, determining the remainder of the division: (access area+2)/4 as a storage memory module number, selecting a storage memory module, deciding the need of generating backup data based on whether a FAST WRITE process is carried out or not, if the FAST WRITE process is carried out, determining the remainder of the division: (storage memory module number+1)/4 as a backup memory module number, deciding whether a backup memory module is suffering a failure or not, if the backup memory module is suffering a failure, determining the remainder of the division: (storage memory module number+3)/4 as a backup memory module number, selecting a backup memory module simultaneously with the storage memory module, and determining a storage position from cache directory information.

The above and other objects, features, and advantages of the present invention will become apparent from the following description with reference to the accompanying drawings which illustrate examples of the present invention.

BRIEF DESCRIPTION OF THE DRAWINGS

FIG. 2 is a diagram illustrative of data storage in a RAID-5 system;

FIGS. 3(a) and 3(b) are diagrams showing the manner in which data are managed by a method of controlling a disk cache according to a first embodiment of the present invention;

FIGS. 4(a) and 4(b) are diagrams showing the manner in which data are managed by a method of controlling a disk cache according to a second embodiment of the present invention;

DETAILED DESCRIPTION OF THE PREFERRED EMBODIMENTS

Figure 1A:
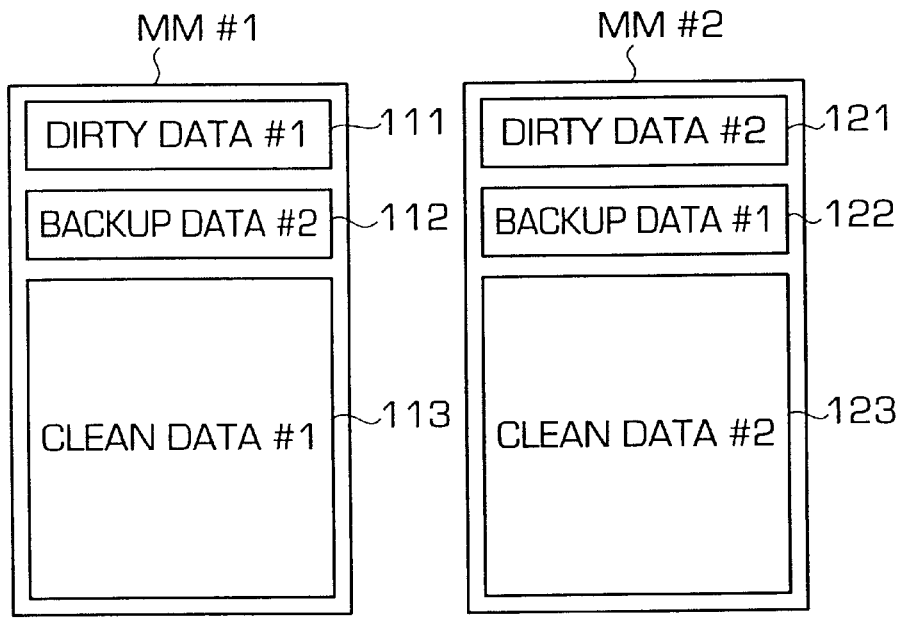
FIGS. 1(a) and 1b) are diagrams showing the manner in which non-updated data are managed by dual cache memories in conventional methods of controlling a disk cache.
Figure 1B:
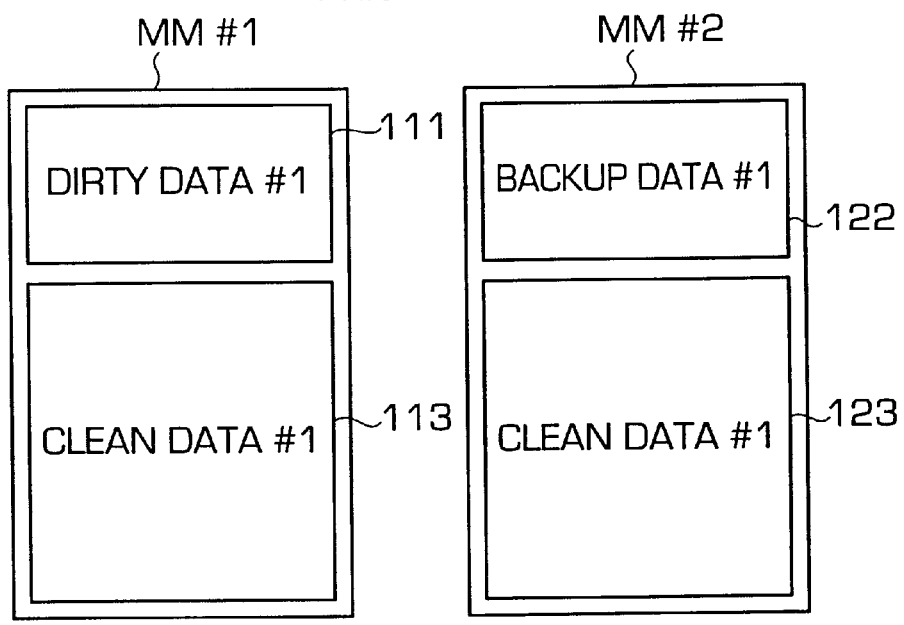

FIGS. 3(a) and 3(b) show the manner in which data are managed by a method of controlling a disk cache according to a first embodiment of the present invention. According to the first embodiment, the disk cache comprises three independent cache memories mounted as physically independent first, second, and third memory modules MM#1, MM#2, MM#3 on a logic circuit board. Under normal conditions, as shown in FIG. 3(a), the three independent memory modules MM#1, MM#2, MM#3 independently manage dirty data 111, 121, 131 stored according to a FAST WRITE process based on a command from a preceding stage, but not written on a disk, backup data 112, 122, 132 for backing up the dirty data which have been written in the other memory modules, but not written on the disk, and clean data 113, 123, 133 that are in conformity with data written on the disk. Memory modules to store data are determined in advance according to an address (logic disk number) of the disk and addresses (sector numbers) of recording areas.

Operation of the disk cache when all the memory modules MM#1, MM#2, MM#3 can be used will be described below with reference to FIG. 3(a). For storing data in response to a FAST WRITE command from a preceding stage, a memory module (hereinafter referred to as a storage memory module) to store the data is determined according to predetermined rules, and the data is stored as dirty data, e.g., dirty data 111, in the determined storage memory module, e.g., the memory module MM#1. At the same time, a memory module (hereinafter referred to as a backup memory module) for storing backup data for the dirty data stored in the storage memory module is determined, and the same data as the dirty data is stored as backup data, e.g., the backup data 122, in the backup memory module, e.g., the memory module MM#2.

When data is read from the disk, a storage memory module for storing the read data is determined, and the read data is stored as clean data, e.g., the clean data 113, in the determined storage memory module, e.g., the memory module MM#1.

If there is no memory space available for storing data in a FAST WRITE process, then stored data of lowest priority is deleted from an clean data storage area in the memory modules which has been determined according to an LRU (Least Recently Used) algorithm, and the data read from the disk is stored in the clean data storage area.

The dirty data is asynchronously written on the disk. When the writing of the dirty data on the disk is completed, the memory space from which the dirty data has been read will be available as a clean data storage area, and the memory space in the other memory module which has stored the backup data for the read dirty data is freed.

Operation of the disk cache when one of the three memory modules MM#1, MM#2, MM#3 cannot be used due to a fault will be described below with reference to FIG. 3(b). It is assumed that the first memory module MM#1 suffers a failure.

FIG. 3(b) shows the storage of data changed due to the failure of the first memory module MM#1.

When the first memory module MM#1 cannot be used due to a fault, the dirty data 111 stored in the first memory module MM#1 is lost, and hence the backup data 122 stored in the second memory module MM#2 is used instead of the lost dirty data 111.

Since the substituting dirty data 122 has no redundancy, the dirty data 122 is copied to the third memory module MM#3 independent of the second memory module MM#2 which stores the dirty data 122, and the copied data is stored as new backup data 111' in the third memory module MM#3.

In order to keep a memory space for storing the new backup data 111' in the third memory module MM#3, data of low priority is deleted, if necessary, from the clean data 133 stored in the third memory module MM#3, creating a memory space.

Furthermore, the dirty data 131 stored in the third memory module MM#3 loses its backup data 112 due to the failure of the first memory module MM#1 and hence has no redundancy. Therefore, the dirty data 131 is copied to the second memory module MM#2 independent of the third memory module MM#3, and the copied data is stored as new backup data 112' in the second memory module MM#2.

In order to keep a memory space for storing the new backup data 112' in the second memory module MM#2, data of low priority is deleted, if necessary, from the clean data 123 stored in the second memory module MM#2, creating a memory space.

The redundancy of all the non-updated data is now recovered by the above operation of the disk cache.

Thereafter, until the first memory module MM#1 is recovered from the fault, all data to be stored in the first memory module MM#1 are handled so as to be stored in the second memory module MM#2 for continued memory data processing.

In the method of controlling a disk cache according to the first embodiment, even when the first memory module MM#1 cannot be used due to a failure, any data which is lost by the failure and has not be written on the disk can be restored with its backup data that is stored in the second memory module MM#2.

While the backup data stored in the first memory module MM#1 for dirty data stored in another memory module is also lost on account of the fault of the first memory module MM#1, since the lost data is backup data and its original dirty data is stored in the other memory module, no non-updated data is lost completely.

Similarly, while data in conformity with data on the disk may be stored in the first memory module MM#1 and lost because of the fault of the first memory module MM#1, the data can be restored when it is read again from the disk, and hence will not be lost completely.

Therefore, even when one memory modules fails to operate, all the data are assured, but only part of the data loses its redundancy.

The dirty data 111 stored in the first memory module MM#1, which has lost its redundancy due to the failure of the first memory module MM#1, recovers its redundancy by copying the backup data 122 stored in the second memory module MM#2 to the third memory module MM#3, so that the same data as the dirty data 111 is stored in both the second and third memory modules MM#2, MM#3.

Likewise, the dirty data 131 stored in the third memory module MM#3, which has lost its redundancy due to the failure of the first memory module MM#1, recovers its redundancy by copying itself to the second memory module MM#2, so that the same data as the dirty data 131 is stored in both the second and third memory modules MM#2, MM#3.

FIGS. 4(a) and 4(b) show the manner in which data are managed by a method of controlling a disk cache according to a second embodiment of the present invention. According to the second embodiment, the disk cache comprises four independent cache memories mounted as physically independent first, second, third, and fourth memory modules MM#1, MM#2, MM#3, MM#4 on a logic circuit board. Usually, the probability that two independent memory modules will simultaneously suffer a fault is very low. However, some fault external to the memory modules may possibly inflict a plurality of memory modules at the same time. For example, if the memory modules MM#1, MM#2, MM#3, MM#4 are not energized by respective independent power supplies, then a plurality of memory modules may possibly be made inoperative at the same time due to a power supply failure.

It is assumed in FIGS. 4(a) and 4(b) that the first and second memory modules MM#1, MM#2 are energized by a common power supply and the third and fourth memory modules MM#3, MM#4 are energized by a common power supply. With such a power supply configuration, two memory modules may simultaneously be brought out of operation due to a failure of one of the power supplies.

Operation of the disk cache when two of the four memory modules MM#1, MM#2, MM#3, MM#4 cannot be used due to an external failure, such as a power supply failure, will be described below with reference to FIGS. 4(a) and 4(b).

Under normal conditions, memory modules to store data are determined in advance according to an address (logic disk number) of the disk and addresses (sector numbers) of recording areas. As shown in FIG. 4(a), the four independent memory modules MM#1, MM#2, MM#3, MM#4 independently manage dirty data 111, 121, 131, 141 stored according to a FAST WRITE process based on a command from a preceding stage, but not written on a disk, backup data 112, 122, 132, 142 for backing up the dirty data which have been written in the other memory modules, but not written on the disk, and clean data 113, 123, 133, 143 that are in conformity with data written on the disk. In view of possible failures of the common power supplies, the backup data for the dirty data stored in the first and second memory modules MM#1, MM#2 are stored in the third and fourth memory modules MM#3, MM#4 which are energized by the power supply different from the power supply of the first and second memory modules MM#1, MM#2.

As shown in FIG. 4(b), when first and second memory modules MM#1, MM#2 are simultaneously made inoperative, the dirty data 111, 121 are lost. Therefore, the backup data 132, 142 stored in the third and fourth memory modules MM#3, MM#4 are used instead of the lost dirty data 111, 121 for continued memory data processing.

In order to restore redundancy of all the data, the dirty data 131, 132 stored in the third memory module MM#3 are copied to the fourth memory module MM#4 independent of the third memory module MM#3, creating backup data 112', 111' for the dirty data 131, 132 in the fourth memory module MM#4.

Similarly, the dirty data 141, 142 stored in the fourth memory module MM#4 are copied to the third memory module MM#3 independent of the fourth memory module MM#4, creating backup data 122', 121' for the dirty data 141, 142 in the third memory module MM#3.

Figure 5:
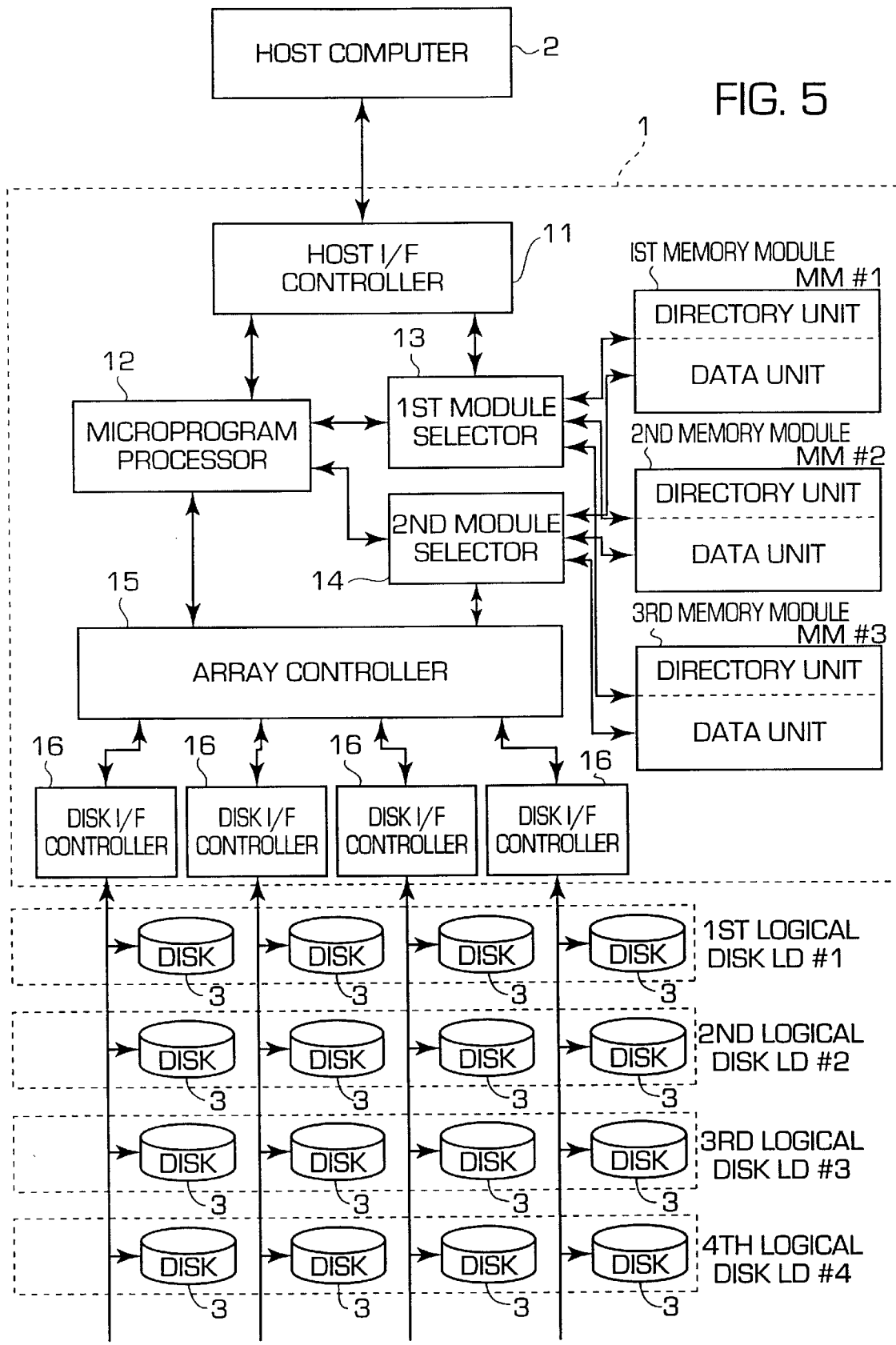
FIG. 5 is a block diagram of a disk system to which the method of controlling a disk cache according to the first embodiment is applied.

FIG. 5 shows in block form a disk system to which the method of controlling a disk cache according to the first embodiment is applied. As shown in FIG. 5, the disk system has a plurality of disks 3 arranged in four arrays and connected through a disk controlling apparatus 1 to a host computer 2. The disk controlling apparatus 1 comprises a host interface (I/F) controller 11, a microprogram processor 12, a first module selector 13, a second module selector 14, first, second, and third memory modules MM#1, MM#2, MM#3, an array controller 15, and four disk I/F controllers 16. Sets of four physical disks 3 across the four arrays serve as logical disks LD#1, LD#2, . . . each handled as a single disk by the host computer 2. Each of the logical disks LD#1, LD#2, . . . serves as a RAID-5 system which comprises four physical disks 3. The disk controlling apparatus 1 does not transfer data directly between the host computer 2 and the disks 3, but stores data in a disk cache and then transfers the data.

The host I/F controller 11 comprises a control circuit for an interface with the host computer 2, and is controlled for its operation by the microprogram processor 12.

The microprogram processor 12 controls operation of various functional blocks of the disk controlling apparatus 1.

The first module selector 13 serves as a means for selecting one of the memory modules MM#1, MM#2, MM#3 for data transfer between the host I/F controller 11 and the selected one of the memory modules MM#1, MM#2, MM#3.

The second module selector 14 serves as a means for selecting one of the memory modules MM#1, MM#2, MM#3 for data transfer between the array controller 15 and the selected one of the memory modules MM#1, MM#2, MM#3

Each of the first, second, and third memory modules MM#1, MM#2, MM#3 comprises a disk cache memory, and has a data unit for storing data and a directory unit for storing control information such as an LRU table, etc. Control information relative to the data unit of each memory module is stored in the directory unit of the same memory module.

The array controller 15 determines an association between addresses on the logical disks LD#1, LD#2, . . . as viewed from the host computer 2 and actual addresses to store data on the disks 3, and control interfacing with the disks 3.

Each of the disk I/F controllers 16 comprises a control circuit for an interface with the array of the disks 3 connected thereto.

Figure 6:
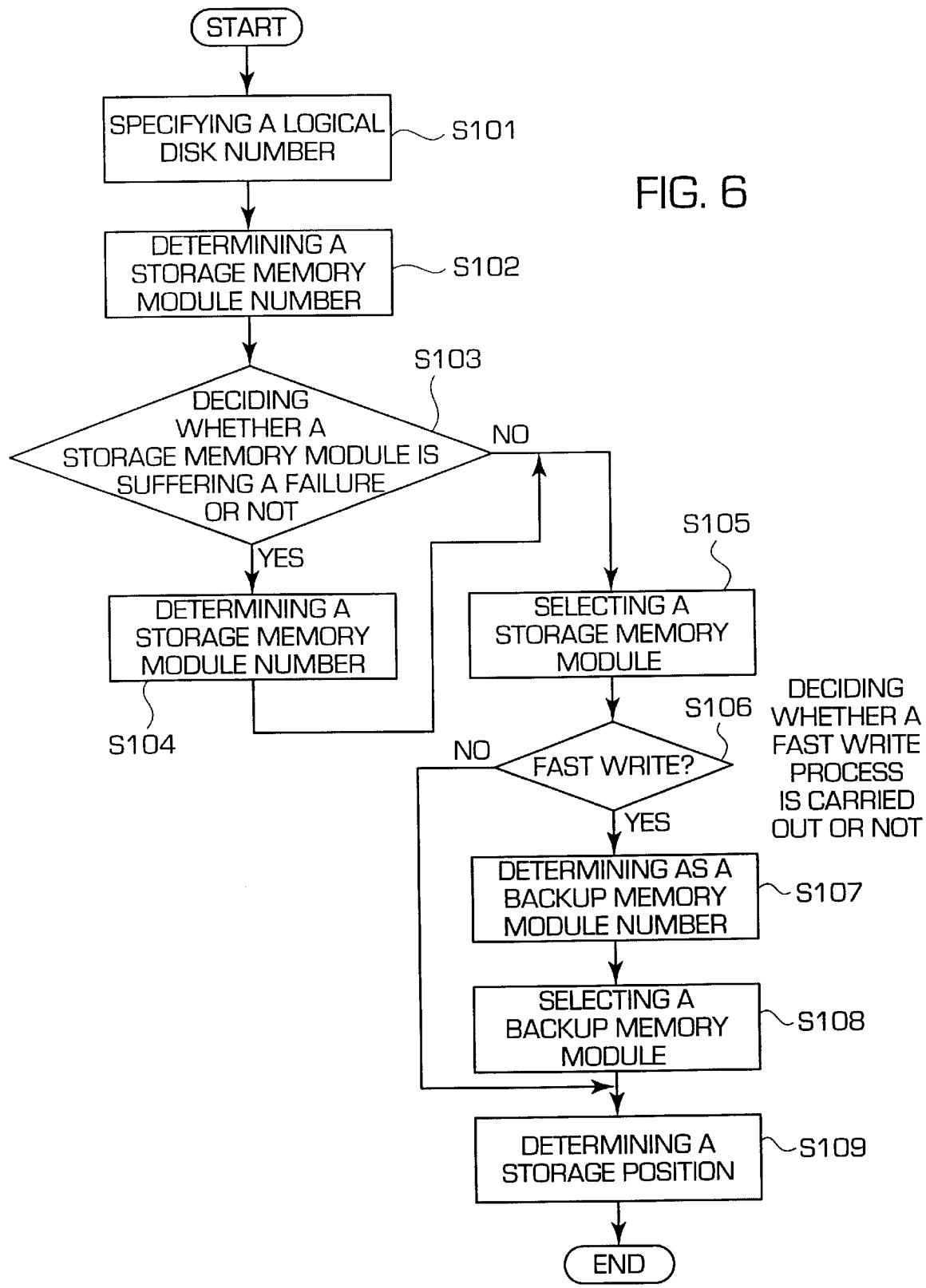
FIG. 6 is a flowchart of a process of determining a storage memory module with a disk controlling apparatus comprising three memory modules to which the method of controlling a disk cache according to the first embodiment is applied.

FIG. 6 shows a process of determining a storage memory module with the disk controlling apparatus 1 comprising the memory modules MM#1, MM#2, MM#3 to which the method of controlling a disk cache according to the first embodiment is applied. The process shown in FIG. 6 comprises a step S101 of specifying a logical disk number, a step S102 of determining a storage memory module number, a step S103 of deciding whether a storage module is suffering a failure, a step S104 of changing a storage memory module number, a step S105 of selecting a storage memory module, a step S106 of deciding whether a FAST WRITE process is carried out, a step S107 of determining a backup memory module number, a step S108 of selecting a backup memory module, and a step S109 of determining a storage position.

Figure 7:
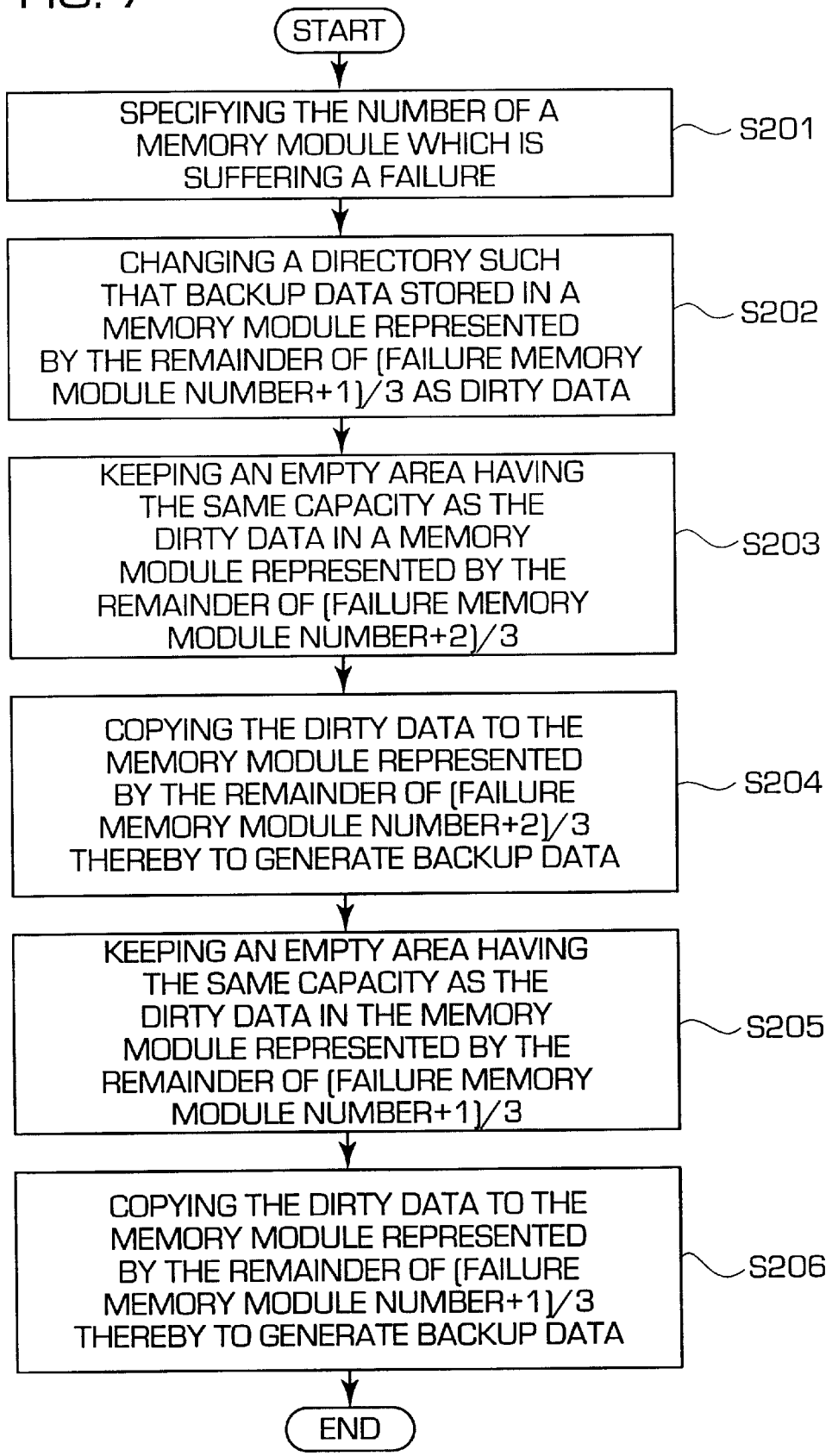
FIG. 7 is a flowchart of a recovery process carried out when one memory module suffers a failure with the disk controlling apparatus comprising three memory modules to which the method of controlling a disk cache according to the first embodiment is applied.

FIG. 7 shows a recovery process carried out when one memory module suffers a failure with the disk controlling apparatus 1 comprising the memory modules MM#1, MM#2, MM#3 to which the method of controlling a disk cache according to the first embodiment is applied. As shown in FIG. 7, the recovery process comprises a step S201 of specifying a memory module number which is suffering a failure, a step S202 of changing a directory, a step S203 of keeping an empty area, a step S204 of generating backup data, a step S205 of keeping an empty area, and a step S206 of generating backup data. The method of controlling a disk cache according to the first embodiment will be described below.

(1) First, the process of determining a storage memory module with the disk controlling apparatus 1 comprising the memory modules MM#1, MM#2, MM#3 will be described below with reference to FIG. 6.

The microprogram processor 12 specifies a logical disk number for which an I/O (input/output) signal is issued from the host computer 2 in the step S101, and determines the remainder of the division: logical disk number/3 as a storage memory module number in the step S102. Then, the microprogram processor 12 decides whether the storage memory module is suffering a failure or not in the step S103. If the storage memory module is suffering a failure, then the microprogram processor 12 determines the remainder of the division: (logical disk number+1)/3 as a storage memory module number in the step S104. Thereafter, the microprogram processor 12 controls the first module selector 13 to select a storage memory module in the step S105, and decides the need of generating backup data based on whether a FAST WRITE process is carried out or not in the step S106. If the FAST WRITE process is carried out, then the microprogram processor 12 determines the remainder of the division: (storage memory module number+1)/3 as a backup memory module number in the step S107. The microprogram processor 12 controls the first module selector 13 to select a backup memory module simultaneously with the storage memory module in the step S108. Finally, the microprogram processor 12 determines a storage position from cache directory information in the step S109.

(2) The recovery process carried out when one memory module suffers a failure with the disk controlling apparatus 1 comprising the memory modules MM#1, MM#2, MM#3 will be described below with reference to FIG. 7.

The microprogram processor 12 specifies the number of a memory module which is suffering a failure in the step S201, and changes a directory such that the backup data 122 stored in the memory module which is represented by the remainder of the division: (failure memory module number+1)/3 will be handled as the dirty data 122 in the step S202. Then, the microprogram processor 12 deletes the clean data 133, if necessary, and keeps an empty area having the same capacity as the dirty data 122 in the memory module which is represented by the remainder of the division: (failure memory module number+2)/3 in the step S203. The microprogram processor 12 copies the dirty data 122 to the memory module which is represented by the remainder of the division: (failure memory module number+2)/3, thus generating the backup data 111' in the step S204. The microprogram processor 12 deletes the clean data 123, if necessary, and keeps an empty area having the same capacity as the dirty data 131 in the memory module which is represented by the remainder of the division: (failure memory module number+1)/3 in the step S205. Finally, the microprogram processor 12 copies the dirty data 131 to the memory module which is represented by the remainder of the division: (failure memory module number+1)/3, thus generating the backup data 112' in the step S206.

A method of controlling a disk cache according to a second embodiment of the present invention will be described below.

A disk system to which the method of controlling a disk cache according to the second embodiment is applied is similar to the disk system shown in FIG. 5 except that a fourth memory module MM#4 is added to the disk controlling apparatus 1. Therefore, the disk system to which the method of controlling a disk cache according to the second embodiment is applied is not illustrated and will be described with reference to FIG. 5.

Figure 8:
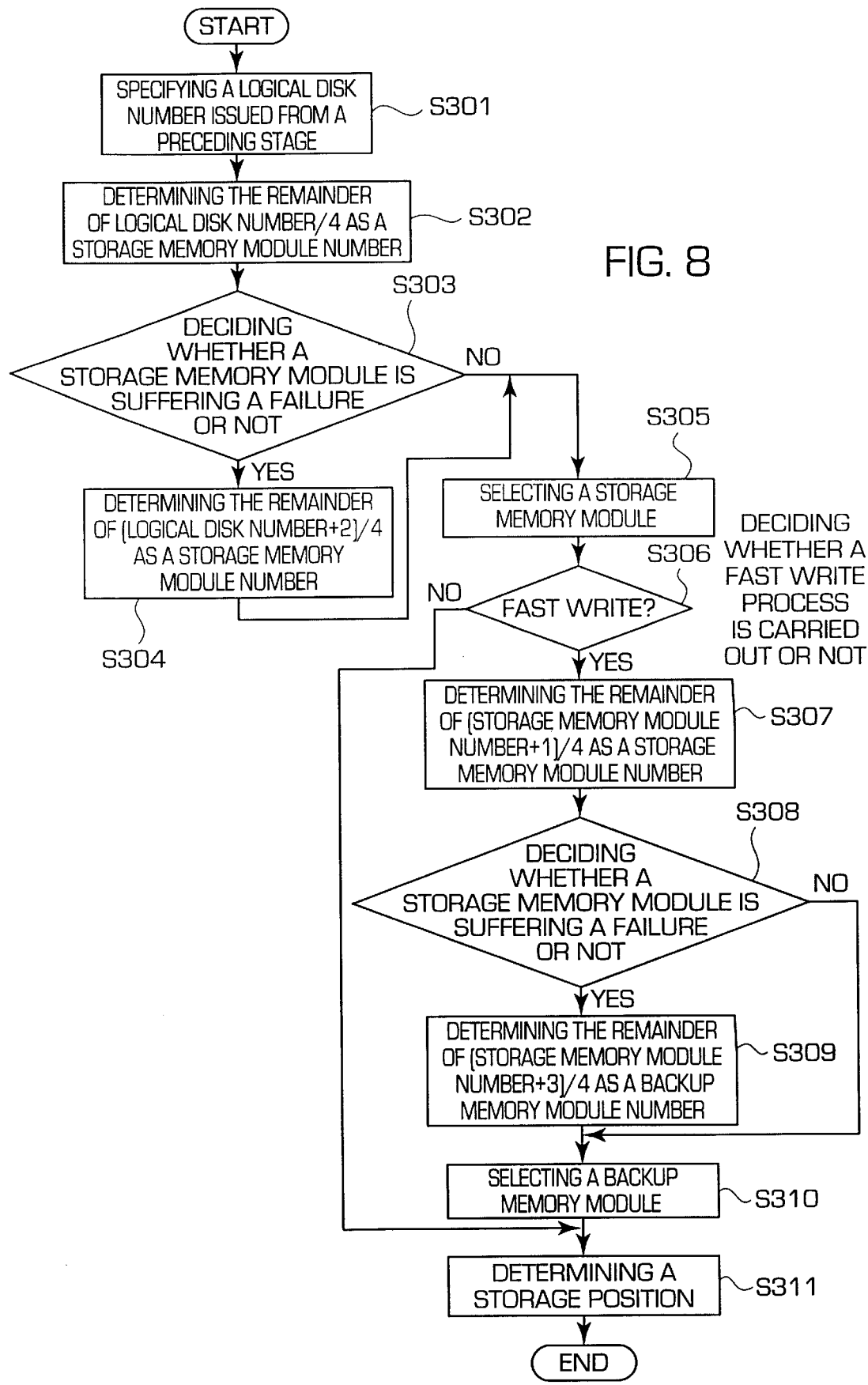
FIG. 8 is a flowchart of a process of determining a storage memory module with a disk controlling apparatus comprising four memory modules to which a method of controlling a disk cache according to a second embodiment of the present invention is applied.

FIG. 8 shows a process of determining a storage memory module with the disk controlling apparatus comprising the four memory modules MM#1, MM#2, MM#3, MM#4 to which the method of controlling a disk cache according to the second embodiment is applied. As shown in FIG. 8, the process comprises a step S301 of specifying a logical disk number, a step S302 of determining a storage memory module number, a step S303 of deciding whether a storage module is suffering a failure, a step S304 of changing a storage memory module number, a step S305 of selecting a storage memory module, a step S306 of deciding whether a FAST WRITE process is carried out, a step S307 of determining a backup memory module number, a step S308 of deciding whether a backup module is suffering a failure, a step S309 of changing a backup memory module number, a step S310 of selecting a backup memory module, and a step S311 of determining a storage position.

Figure 9:
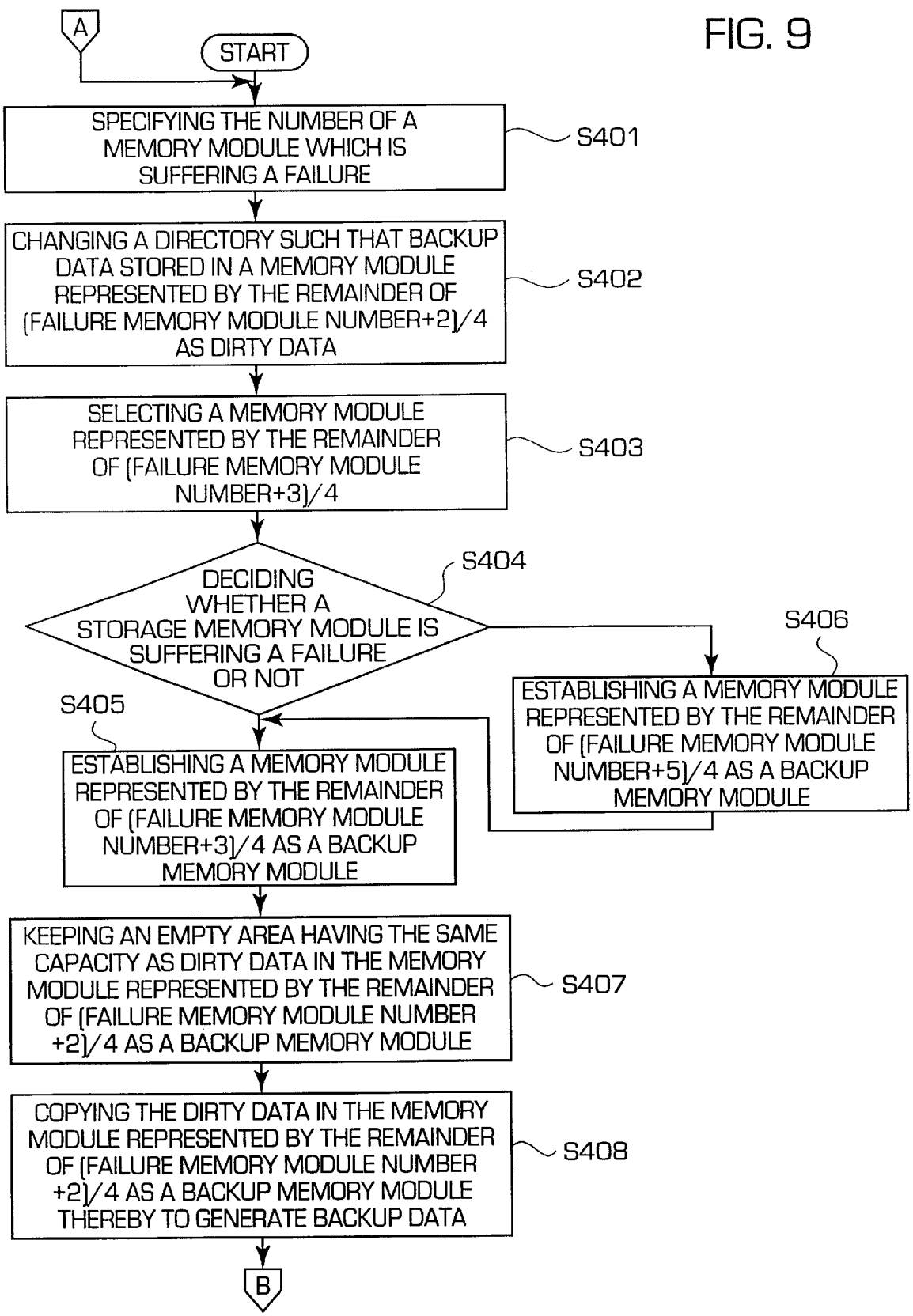
FIG. 9 is a flowchart of a former portion of a recovery process carried out when two memory modules simultaneously suffer a failure with the disk controlling apparatus comprising four memory modules to which the method of controlling a disk cache according to the second embodiment is applied.
Figure 10:
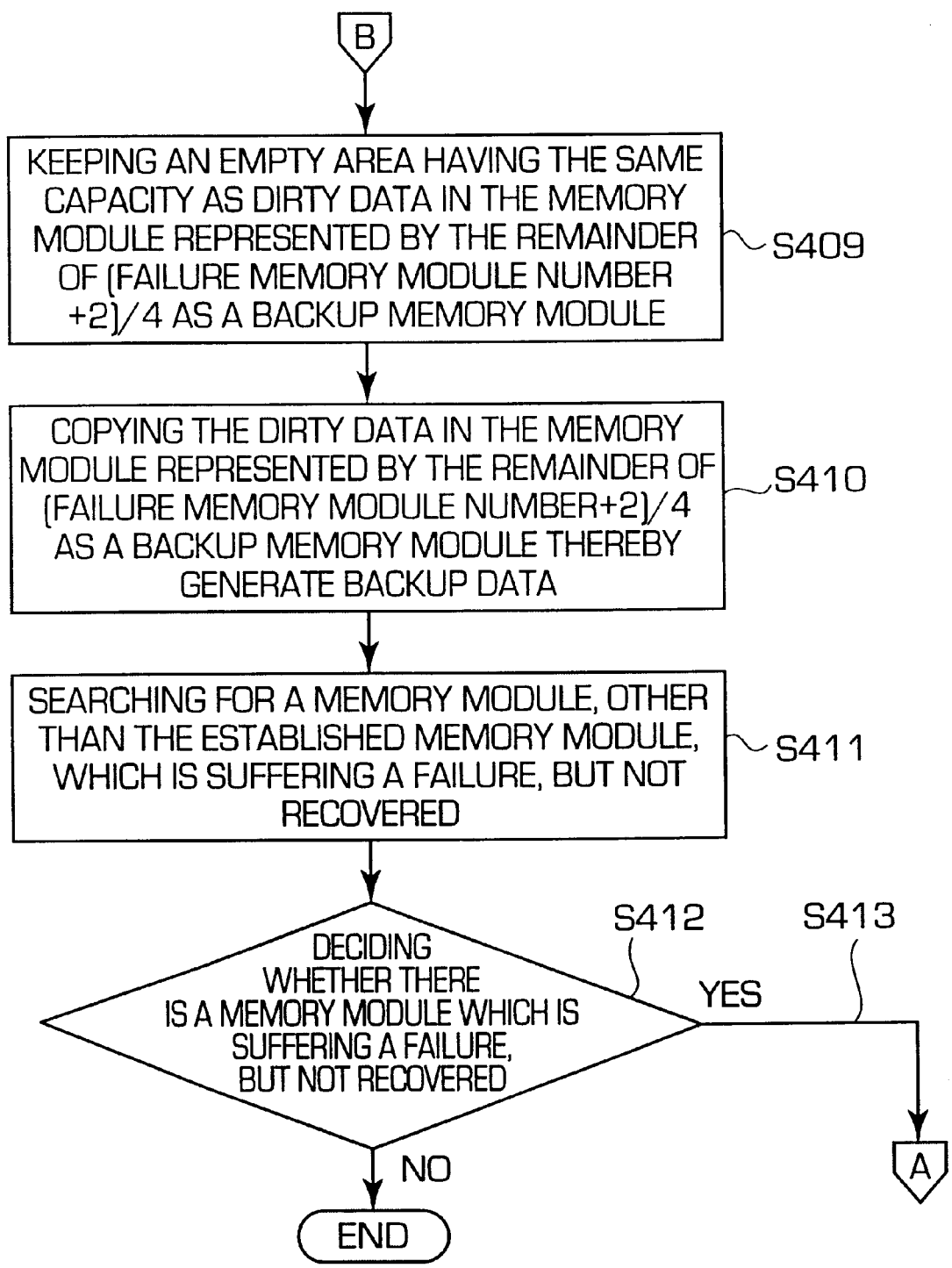
FIG. 10 is a flowchart of a latter portion of the recovery process carried out when two memory modules simultaneously suffer a failure with the disk controlling apparatus comprising four memory modules to which the method of controlling a disk cache according to the second embodiment is applied.

FIGS. 9 and 10 show a recovery process carried out when two memory modules simultaneously suffer a failure with the disk controlling apparatus comprising the four memory modules MM#1, MM#2, MM#3, MM#4 to which the method of controlling a disk cache according to the second embodiment is applied. As shown in FIGS. 9 and 10, the recovery process comprises a step S401 of specifying memory module numbers which are suffering a failure, a step S402 of changing a directory, a step S403 of selecting a memory module, a step S404 of deciding whether a selected memory module is suffering a failure, a step S405 of establishing a backup module, a step S406 of establishing a backup module, a step S407 of keeping an empty area, a step S408 of generating backup data, a step S409 of keeping an empty area, a step S410 of generating backup data, a step S411 of searching for a memory module which is suffering a failure, but not recovered, and a step S412 of deciding whether there is a memory module which is suffering a failure, but not recovered.

The method of controlling a disk cache according to the second embodiment will be described below.

(1) First, the process of determining a storage memory module with the disk controlling apparatus 1 comprising the memory modules MM#1, MM#2, MM#3 will be described below with reference to FIG. 8.

The microprogram processor 12 specifies a logical disk number for which an I/O (input/output) signal is issued from the host computer 2 in the step S301, and determines the remainder of the division: logical disk number/4 as a storage memory module number in the step S302. Then, the microprogram processor 12 decides whether the storage memory module is suffering a failure or not in the step S303. If the storage memory module is suffering a failure, then the microprogram processor 12 determines the remainder of the division: (logical disk number+2)/4 as a storage memory module number in the step S304. Thereafter, the microprogram processor 12 controls the first module selector 13 to select a storage memory module in the step S305, and decides the need of generating backup data based on whether a FAST WRITE process is carried out or not in the step S306. If the FAST WRITE process is carried out, then the microprogram processor 12 determines the remainder of the division: (storage memory module number+1)/4 as a backup memory module number in the step S307. The microprogram processor 12 decides whether the backup module is suffering a failure or not in the step S308. If the backup module is suffering a failure, then the microprogram processor 12 determines the remainder of the division: (storage memory module number+3)/4 as a backup memory module number in the step S309. Thereafter, the microprogram processor 12 controls the first module selector 13 to select a backup memory module simultaneously with the storage memory module in the step S310. Finally, the microprogram processor 12 determines a storage position from cache directory information in the step S311.

(2) The recovery process carried out when the two memory modules MM#1, MM#2 simultaneously suffer a failure with the disk controlling apparatus 1 comprising the memory modules MM#1, MM#2, MM#3, MM#4 will be described below with reference to FIGS. 9 and 10.

The microprogram processor 12 specifies the number of a memory module which is suffering a failure in the step S401, and changes a directory such that the backup data 132 (142) stored in the memory modules which is represented by the remainder of the division: (failure memory module number+2)/4 will be handled as the dirty data 132 (142) in the step S402. Then, the microprogram processor 12 selects a memory module represented by the remainder of the division: (failure memory module number+3)/4 in the step S403, and decides whether the selected memory module is suffering a failure or not in the step S404. If the selected memory module is not suffering a failure, then the microprogram processor 12 establishes a memory module represented by the remainder of the division: (failure memory module number+3)/4 as a backup memory module in the step S405. If the selected memory module is suffering a failure, then the microprogram processor 12 establishes a memory module represented by the remainder of the division: (failure memory module number+5)/4 as a backup memory module in the step S406. Then, the microprogram processor 12 deletes the clean data 143 (133), if necessary, and keeps an empty area having the same capacity as the dirty data 132 (142) in a memory module represented by the remainder of the division: (failure memory module number+2)/4, in the established memory module in the step S407. The microprogram processor 12 copies the dirty data 132 (142) in the memory module represented by the remainder of the division: (failure memory module number+2)/4 to the established memory module, thus generating the backup data 111' (121') in the step S408. The microprogram processor 12 deletes the clean data 143 (133), if necessary, and keeps an empty area having the same capacity as the dirty data 131 (141) in a memory module represented by the remainder of the division: (failure memory module number+2)/4, in the established memory module in the step S409. The microprogram processor 12 copies the dirty data 131 (141) in the memory module represented by the remainder of the division: (failure memory module number+2)/4 to the established memory module, thus generating the backup data 112' (122') in the step S410. Thereafter, the microprogram processor 12 searches for a memory module, other than the above memory module, which is suffering a failure, but not recovered, in the step S411, and decides whether there is a memory module which is suffering a failure, but not recovered, in the step S412. If there is a memory module which is suffering a failure, but not recovered, then the microprogram processor 12 returns control to the step S401. If there is no memory module which is suffering a failure, but not recovered, then the recovery process comes to an end.

A method of controlling a disk cache according to a third embodiment of the present invention will be described below. In the first embodiment, a storage memory module is determined per logical disk in the disk controlling apparatus 1 comprising the three memory modules MM#1, MM#2, MM#3. According to the third embodiment, however, a storage memory module is determined per predetermined logical disk size, e.g., 1 Gbytes. A disk system to which the method of controlling a disk cache according to the third embodiment is applied is the same as the disk system shown in FIG. 5, and therefore is not illustrated and will be described with reference to FIG. 5. A recovery process carried out when one memory module suffers a failure with the disk controlling apparatus 1 comprising the memory modules MM#1, MM#2, MM#3 to which the method according to the third embodiment is the same as the recovery process shown in FIG. 7 according to the first embodiment, and will not be described in detail below.

Figure 11:
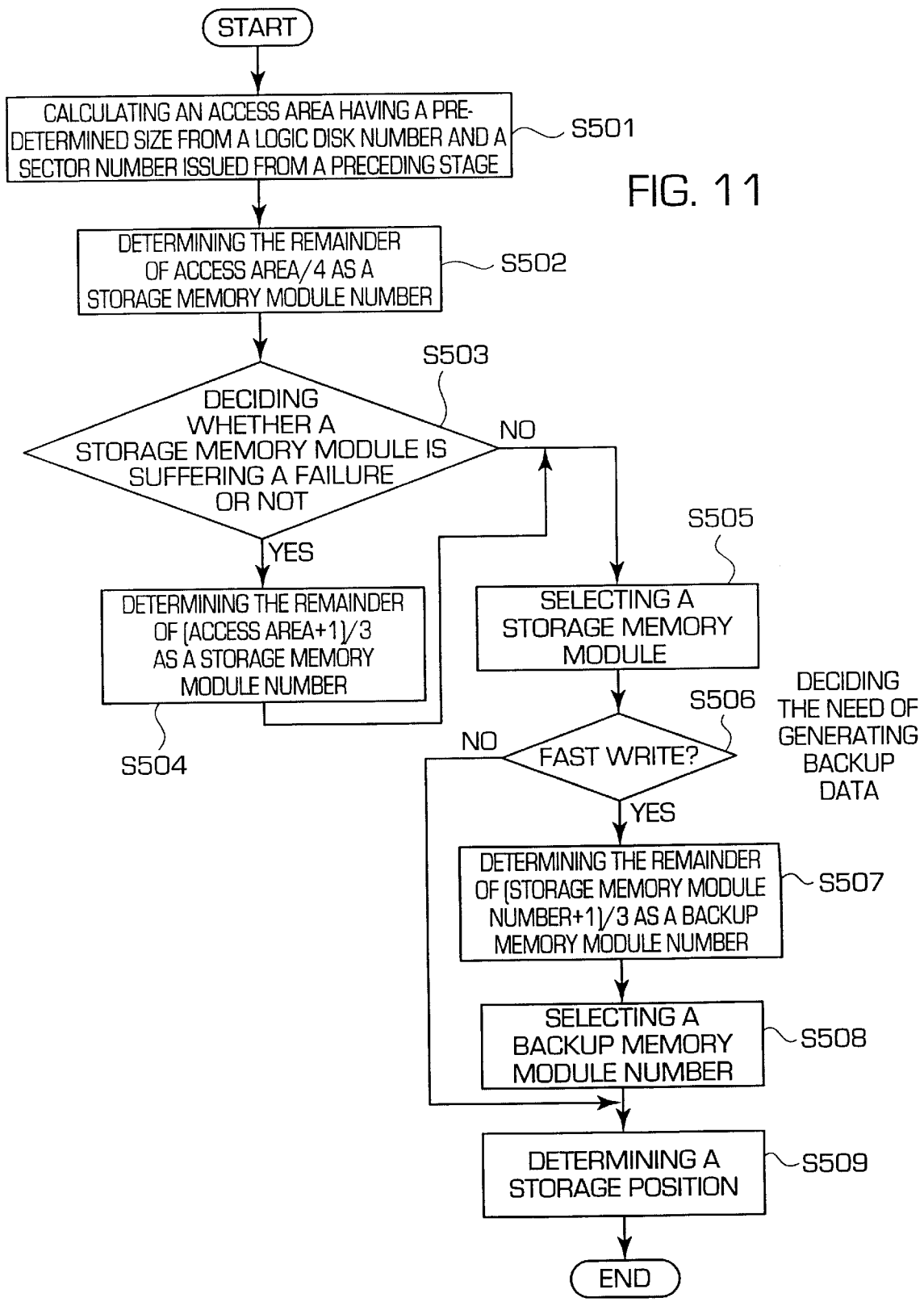
FIG. 11 is a flowchart of a process of determining a storage memory module with a disk controlling apparatus comprising three memory modules to which a method of controlling a disk cache according to a third embodiment of the present invention is applied.

FIG. 11 shows a process of determining a storage memory module with the disk controlling apparatus comprising the three memory modules MM#1, MM#2, MM#3 to which the method of controlling a disk cache according to the third embodiment of the present invention is applied. The process shown in FIG. 11 comprises a step S501 of calculating an access area, a step S502 of determining a storage memory module number, a step S503 of deciding whether a storage memory module is suffering a failure, a step S504 of changing a storage memory module number, a step S505 of selecting a storage memory module, a step S506 of deciding whether a FAST WRITE process is carried out, a step S507 of determining a backup memory module number, a step S508 of selecting a backup memory module, and a step S509 of determining a storage position.

The method of controlling a disk cache according to the third embodiment will be described below. The process of determining a storage memory module with the disk controlling apparatus 1 comprising the three memory modules MM#1, MM#2, MM#3 will be described below with reference to FIG. 11.

The microprogram processor 12 calculates an access area={Σ(storage capacity of logical disk number LD#i)+ (sector number SEC#−1)×sector size}. ÷$2^{30}$ (where Σ represents the sum for i=0~n−1) from a logical disk number LD#n and a sector number SEC# for which an I/O (input/output) signal is issued from the host computer 2 in the step S501. Then, the microprogram processor 12 determines the remainder of the division: access area/3 as a storage memory module number in the step S502. The microprogram processor 12 decides whether the storage memory module is suffering a failure or not in the step S503. If the storage memory module is suffering a failure, then the microprogram processor 12 determines the remainder of the division: (access area+1)/3 as a storage memory module number in the step S504. Thereafter, the microprogram processor 12 controls the first module selector 13 to select a storage memory module in the step S505, and decides the need of generating backup data based on whether a FAST WRITE process is carried out or not in the step S506. If the FAST WRITE process is carried out, then the microprogram processor 12 determines the remainder of the division: (storage memory module number+1)/3 as a backup memory module number in the step S507. The microprogram processor 12 controls the first module selector 13 to select a backup memory module simultaneously with the storage memory module in the step S508. Finally, the microprogram processor 12 determines a storage position from cache directory information in the step S509.

A method of controlling a disk cache according to a fourth embodiment of the present invention will be described below. In the second embodiment, a storage memory module is determined per logical disk in the disk controlling apparatus 1 comprising the four memory modules MM#1, MM#2, MM#3, MM#4. According to the fourth embodiment, however, a storage memory module is determined per predetermined logical disk size, e.g., 1 Gbytes. A disk system to which the method of controlling a disk cache according to the fourth embodiment is applied is the same as the disk system shown in FIG. 5 with the fourth memory module MM#4 added thereto, and therefore is not illustrated and will be described with reference to FIG. 5. A recovery process carried out when two memory modules suffer a failure with the disk controlling apparatus 1 comprising the memory modules MM#1, MM#2, MM#3, MM#4 to which the method according to the fourth embodiment is the same as the recovery process shown in FIGS. 9 and 10 according to the second embodiment, and will not be described in detail below.

Figure 12:
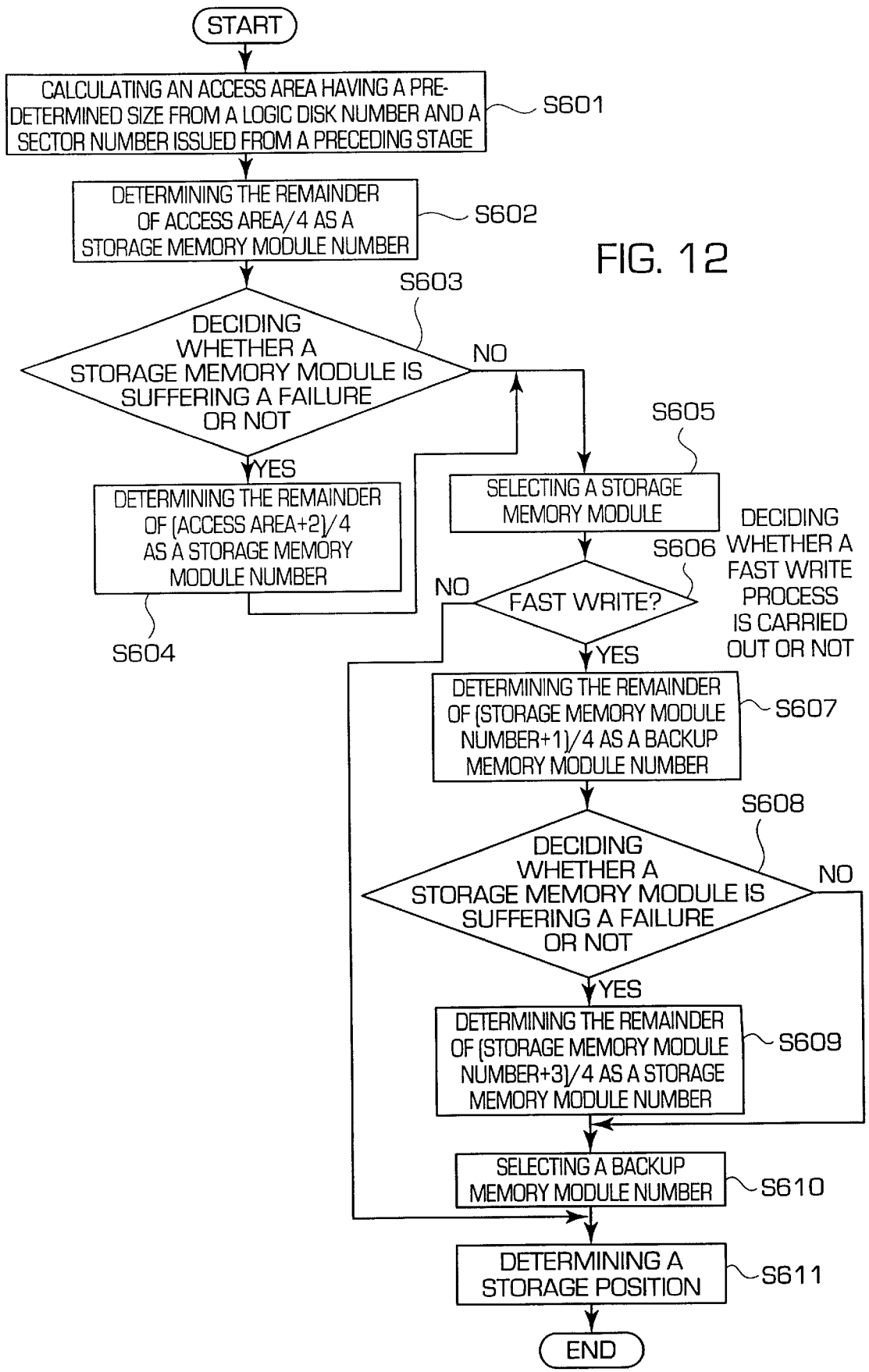
FIG. 12 is a flowchart of a process of determining a storage memory module with a disk controlling apparatus comprising four memory modules to which a method of controlling a disk cache according to a fourth embodiment of the present invention is applied.

FIG. 12 shows a process of determining a storage memory module with the disk controlling apparatus comprising the four memory modules MM#1, MM#2, MM#3, MM#4 to which the method of controlling a disk cache according to the fourth embodiment of the present invention is applied. The process shown in FIG. 12 comprises a step S601 of calculating an access area, a step S602 of determining a storage memory module number, a step S603 of deciding whether a storage memory module is suffering a failure, a step S604 of changing a storage memory module number, a step S605 of selecting a storage memory module, a step S606 of deciding whether a FAST WRITE process is carried out, a step S607 of determining a backup memory module number, a step S608 of deciding whether a backup module is suffering a failure, a step S609 of changing a backup memory module number, a step S610 of selecting a backup memory module, and a step S611 of determining a storage position.

The method of controlling a disk cache according to the fourth embodiment will be described below. The process of determining a storage memory module with the disk controlling apparatus 1 comprising the four memory modules MM#1, MM#2, MM#3, MM#4 will be described below with reference to FIG. 12.

The microprogram processor 12 calculates an access area={Σ(storage capacity of logical disk number LD#i)+ (sector number SEC#−1)×sector size} ÷$2^{30}$ (where Σ represents the sum for i=0∼n−1) from a logical disk number LD#n and a sector number SEC# for which an I/O (input/output) signal is issued from the host computer 2 in the step S601. Then, the microprogram processor 12 determines the remainder of the division: access area/4 as a storage memory module number in the step S602. The microprogram processor 12 decides whether the storage memory module is suffering a failure or not in the step S603. If the storage memory module is suffering a failure, then the microprogram processor 12 determines the remainder of the division: (access area+2)/4 as a storage memory module number in the step S604. Thereafter, the microprogram processor 12 controls the first module selector 13 to select a storage memory module in the step S605, and decides the need of generating backup data based on whether a FAST WRITE process is carried out or not in the step S606. If the FAST WRITE process is carried out, then the microprogram processor 12 determines the remainder of the division: (storage memory module number+1)/4 as a backup memory module number in the step S607. The microprogram processor 12 decides whether the backup module is suffering a failure or not in the step S608. If the backup module is suffering a failure, then the microprogram processor 12 determines the remainder of the division: (storage memory module number+3)/4 as a backup memory module number in the step S609. The microprogram processor 12 controls the first module selector 13 to select a backup memory module simultaneously with the storage memory module in the step S610. Finally, the microprogram processor 12 determines a storage position from cache directory information in the step S611.

The method of controlling a disk cache according to the present invention offers a first advantage in that non-updated data can be continuously made dual even if one or some of the memory modules cannot be used due to a failure. Since non-updated data can be continuously made dual even if one or some of the memory modules cannot be used due to a failure, it is not necessary to interrupt a FAST WRITE process for reliability or to operate a disk system having no redundancy with the danger of data loss in the event of a failure. Consequently, both high performance and high reliably can be achieved even if one or some of the memory modules are made inoperative due to a failure.

The method of controlling a disk cache according to the present invention offers a second advantage in that a memory space which is installed can effectively be used in the absence of a failure though non-updated data can be continuously made dual in the event of a memory module failure. Stated otherwise, no increase in the cost is caused in order to maintain redundancy.

While preferred embodiments of the present invention have been described using specific terms, such description is for illustrative purposes only, and it is to be understood that changes and variations may be made without departing from the spirit or scope of the following claims.

What is claimed is:

1. A method of controlling a disk cache, comprising the steps of:

providing a disk cache having at least three physically independent memory modules; and distributing data over the memory modules to store, in each of the memory modules, clean data in conformity with data on a disk dirty data as non-updated data, and backup data for non-updated data in another one of the memory modules;

if a first one of the memory modules suffers a failure and data stored in the first memory module is lost, continuously processing lost non-updated data in the first memory module, with backup data stored in a second one of the memory modules for the non-updated data in the first memory module;

copying the backup data stored in the second memory module for the non-updated data in the first memory module to a third one of the memory modules thereby to generate backup data for the lost non-updated data in the first memory module; and copying non-updated data in the third memory module to the second memory module to generate backup data stored in the first memory module for the non-updated data in the third memory module.

2. A method of controlling a disk cache, comprising the steps of:

providing a disk cache having three physically independent memory modules;

specifying a logical disk number for which an I/O signal is issued from a preceding stage;

determining the remainder of the division: logical disk number/3 as a storage memory module number;

deciding whether a storage memory module is suffering a failure or not;

if the storage memory module is suffering a failure, determining the remainder of the division: (logical disk number+1)/3 as a storage memory module number;

selecting a storage memory module;

deciding the need of generating backup data based on whether a FAST WRITE process is carried out or not;

if the FAST WRITE process is carried out, determining the remainder of the division: (storage memory module number+1)/3 as a backup memory module number;

selecting a backup memory module simultaneously with the storage memory module; and determining a storage position from cache directory information.

3. A method according to claim 2, further comprising the steps of:

specifying the number of a memory module which is suffering a failure;

changing a directory such that backup data stored in a memory module which is represented by the remainder of the division: (failure memory module number+1)/3 will be handled as dirty data;

keeping an empty area having the same capacity as the dirty data in a memory module which is represented by the remainder of the division: (failure memory module number+2)/3;

copying the dirty data to the memory module which is represented by the remainder of the division: (failure memory module number+2)/3 thereby to generate backup data;

keeping an empty area having the same capacity as the dirty data in the memory module which is represented by the remainder of the division: (failure memory module number+1)/3; and copying the dirty data to the memory module which is represented by the remainder of the division: (failure memory module number+1)/3 thereby to generate backup data.

4. A method of controlling a disk cache, comprising the steps of:

providing a disk cache having four physically independent memory modules;

specifying a logical disk number for which an I/O signal is issued from a preceding stage;

determining the remainder of the division: logical disk number/4 as a storage memory module number;

deciding whether a storage memory module is suffering a failure or not;

if the storage memory module is suffering a failure, determining the remainder of the division: (logical disk number+2)/4 as a storage memory module number;

selecting a storage memory module;

deciding the need of generating backup data based on whether a FAST WRITE process is carried out or not;

if the FAST WRITE process is carried out, determining the remainder of the division: (storage memory module number+1)/4 as a backup memory module number;

deciding whether a backup memory module is suffering a failure or not;

if the backup memory module is suffering a failure, determining the remainder of the division: (storage memory module number+3)/4 as a backup memory module number;

selecting a backup memory module simultaneously with the storage memory module; and determining a storage position from cache directory information.

5. A method according to claim 4, further comprising the steps of:

specifying the number of a memory module which is suffering a failure;

changing a directory such that backup data stored in a memory module which is represented by the remainder of the division: (failure memory module number+2)/4 will be handled as dirty data;

selecting a memory module which is represented by the remainder of the division: (failure memory module number+3)/4 ;

deciding whether the selected memory module is suffering a failure or not;

if the selected memory module is not suffering a failure, establishing a memory module which is represented by the remainder of the division: (failure memory module number+3)/4 as a backup memory module;

if the selected memory module is suffering a failure, establishing a memory module which is represented by the remainder of the division: (failure memory module number+5)/4 as a backup memory module;

keeping an empty area having the same capacity as dirty data in the memory module which is represented by the remainder of the division: (failure memory module number+2)/4 in the established backup memory module;

copying the dirty data in the memory module which is represented by the remainder of the division: (failure memory module number+2)/4 to the established backup memory module thereby generate backup data;

keeping an empty area having the same capacity as dirty data in the memory module which is represented by the remainder of the division: (failure memory module number+2)/4 in the established backup memory module;

copying the dirty data in the memory module which is represented by the remainder of the division: (failure memory module number+2)/4 to the established backup memory module thereby generate backup data;

searching for a memory module, other than the established memory module, which is suffering a failure, but not recovered;

deciding whether there is a memory module which is suffering a failure, but not recovered; and if there is a memory module which is suffering a failure, but not recovered, repeating the above steps.

6. A method of controlling a disk cache, comprising the steps of:

providing a disk cache having three physically independent memory modules;

calculating an access area having a predetermined size from a logic disk number and a sector number for which an I/O signal is issued from a preceding stage;

determining the remainder of the division: access area/3 as a storage memory module number;

deciding whether a storage memory module is suffering a failure or not;

if a storage memory module is suffering a failure, determining the remainder of the division: (access area+1)/3 as a storage memory module number;

selecting a storage memory module;

deciding the need of generating backup data based on whether a FAST WRITE process is carried out or not;

if the FAST WRITE process is carried out, determining the remainder of the division: (storage memory module number+1)/3 as a backup memory module number;

selecting a backup memory module simultaneously with the storage memory module; and determining a storage position from cache directory information.

7. A method of controlling a disk cache, comprising the steps of:

providing a disk cache having four physically independent memory modules;

calculating an access area having a predetermined size from a logic disk number and a sector number for which an I/O signal is issued from a preceding stage;

determining the remainder of the division: access area/4 as a storage memory module number;

deciding whether a storage memory module is suffering a failure or not;

if a storage memory module is suffering a failure, determining the remainder of the division: (access area+2)/4 as a storage memory module number;

selecting a storage memory module;

deciding the need of generating backup data based on whether a FAST WRITE process is carried out or not;

if the FAST WRITE process is carried out, determining the remainder of the division: (storage memory module number+1)/4 as a backup memory module number;

deciding whether a backup memory module is suffering a failure or not;

if the backup memory module is suffering a failure, determining the remainder of the division: (storage memory module number+3)/4 as a backup memory module number;

selecting a backup memory module simultaneously with the storage memory module; and determining a storage position from cache directory information.

8. A method for controlling a cache memory, comprising (a) providing a cache having a first memory, a second memory, and a third memory;

(b) storing first non-updated data in said first memory;

(c) storing first backup data in said second memory, wherein said first backup data is backup data for said first non-updated data; and (d) if said first memory suffers a failure, copying said first backup data to said third memory as copied first backup data.

9. The method as claimed in claim 8, further comprising:

(e) storing second non-updated data in said second memory; and (f) storing second backup data in a one of said first memory and said third memory, wherein said second backup data is backup data for said second non-updated data.

10. The method as claimed in claim 9, further comprising:

(g) storing third non-updated data in said third memory; and (h) storing third backup data in one of said first memory and said second memory, wherein said third backup data is backup data for said third non-updated data.

11. The method as claimed in claim 10, wherein said third backup data is stored in said first memory and wherein said method further comprises:

(i) if said first memory suffers a failure, copying said third non-updated data to said second memory as copied third non-updated data.

12. The method as claimed as claim 11, wherein said second backup data is stored in said third memory and wherein said method further comprises:

(j) storing first, second, and third clean data in said first, second, and third memories, respectively, wherein said first, second, and third clean data correspond to data stored on a disk.

13. The method as claimed in claim 12, wherein said copied first backup data is used as backup data for said first backup data and wherein said copied third non-updated data is used as backup data for said third non-updated data.

14. A method for controlling a cache memory, comprising (a) providing a cache having a first memory, a second memory, a third memory, and a fourth memory;

(b) storing first non-updated data in said first memory;

(c) storing first backup data in said third memory, wherein said first backup data is backup data for said first non-updated data; and (d) if said first memory suffers a failure, copying said first backup data to said fourth memory as copied first backup data.

15. The method as claimed in claim 14, further comprising:

(e) storing second non-updated data in said second memory; and (f) storing second backup data in said fourth memory, wherein said second backup data is backup data for said second non-updated data.

16. The method as claimed in claim 15, further comprising:

(g) if said second memory suffers a failure, copying said second backup data to said third memory as copied second backup data.

17. The method as claimed in claim 16, wherein third non-updated data is stored in said third memory and third backup data corresponding to said third non-updated data is stored in said first memory, and wherein said method further comprises:

(h) if said first memory suffers a failure, copying said third non-updated data to said fourth memory as copied third non-updated data.

18. The method as claimed in claim 17, wherein fourth non-updated data is stored in said fourth memory and fourth backup data corresponding to said fourth non-updated data is stored in said second memory, and wherein said method further comprises:

(i) if said second memory suffers a failure, copying said fourth non-updated data to said third memory as copied fourth non-updated data.

19. A method of controlling a cache memory, comprising:

(a) providing a cache having at least three memories;

(b) specifying a logical number corresponding to a storage location in a disk apparatus where non-updated data is to be stored;

(c) calculating a memory number based on a remainder of the division: (logical number)/x, wherein x is an integer;

(d) identifying a selected memory of said memories to which said memory number corresponds;

(e) determining whether or not said selected memory is suffering a failure; and (f) if the selected memory is suffering a failure;

(f1) calculating a new memory number based on a remainder of the division: (logical number+y)/x, wherein y is an integer;

(f2) identifying a new selected memory of said memories to which said new memory number corresponds and storing said non-updated data in said new selected memory;

(f3) calculating a backup memory number based on a remainder of the division: (new memory number+z)/x, wherein z is an integer;

(f4) identifying a backup memory of said memories to which said backup memory number corresponds; and (f5) storing backup data in said backup memory, wherein said backup data corresponds to said non-updated data.

20. The method as claimed in claim 19, wherein said logical number designates a logical disk number.

21. The method as claimed in claim 19, wherein said logical number is an access area where said non-updated data is to be stored, and wherein said access area has a predetermined size and is a segmented portion of memory space in said disk apparatus.

22. The method as claimed in claim 19, wherein x equals a total number of said memories.

23. The method as claimed in claim 22, wherein x equals three, y equals one, and z equals one.

24. The method as claimed in claim 22, wherein x equals four, y equals two, and z equals one.

25. The method as claimed in claim 22, wherein said step (f5) comprises:
- (f5a) determining if said backup memory is suffering from a failure;
- (f5b) storing said backup data in said backup memory if said backup memory is not suffering from a failure; and
- (f5c) if said backup memory is suffering from a failure;
  - (f5c1) determining a new backup memory number based on a remainder of the division: (new memory number+a)/x, wherein a is an integer; and
  - (f5c2) identifying a new backup memory of said memories to which said new backup memory number corresponds; and
  - (f5c3) storing said backup data in said new backup memory.

26. The method as claimed in claim 25, wherein x equals four, y equals two, z equals one, and a equals three.

27. A method of controlling a cache memory, comprising:
- (a) providing a cache having at least three memories;
- (b) determining whether or not one of said memories is suffering a failure;
- (c) if a first memory of said memories is suffering a failure, identifying a first memory number corresponding to said first memory;
- (d) identifying a second memory number corresponding to a second memory of said memories based on a remainder of the division: (first memory number+y)/x, wherein x and y are integers and wherein said second memory contains first backup data corresponding to first non-updated data stored in said first memory before said failure;
- (e) identifying a third memory number corresponding to a third memory of said memories based on a remainder of the division: (first memory number+z)/x, wherein z is an integer; and
- (f) copying said first backup data in said second memory to said third memory as copied first backup data.

28. The method as claimed in claim 27, wherein x equals three, y equals one, and z equals two.

29. The method as claimed in claim 27, wherein said third memory stores second non-updated data and wherein said method further comprises:
- (g) copying said second non-updated data in said third memory to said second memory as copied second backup data.

30. The method as claimed in claim 29, wherein said first backup data is deemed to be new first non-updated data,
wherein said copied first backup data is deemed to be new first backup data for said new first non-updated data, and
wherein said copied second backup data is deemed to be new second backup data for said second non-updated data.

31. The method as claimed in claim 27, wherein said step (f) comprises:
- (f1) determining if said third memory suffers a failure; and
- (f2) if said third memory is not suffering a failure, copying said first backup data in said second memory to said third memory as said copied first backup data.

32. The method as claimed in claim 31, further comprising:
- (g) if said third memory is suffering a failure;
  - (g1) identifying a fourth memory number corresponding to a fourth memory of said memories based on a remainder of the division: (first memory number+a)/x, wherein a is an integer; and
  - (g2) copying said first backup data in said second memory to said fourth memory as said copied first backup data.

33. The method as claimed in claim 32, further comprising:
- (h) determining if another one of said memories is suffering a failure;
- (i) if said other one of said memories is suffering a failure, repeat said steps (c) to (i).

34. The method as claimed in claim 33, wherein x equals four, y equals two, z equals three, and a equals five.

35. An apparatus, comprising:
a cache having a first memory, a second memory, and a third memory;
a controller that stores first non-updated data in said first memory and stores first backup data in said second memory,
wherein said first backup data is backup data for said first non-updated data, and
wherein, if said first memory suffers a failure, said controller copies said first backup data to said third memory as copied first backup data.

36. The apparatus as claimed in claim 35, wherein said controller stores second non-updated data in said second memory and stores second backup data in one of said first memory and said third memory, wherein said second backup data is backup data for said second non-updated data.

37. The apparatus as claimed in claim 36, wherein said controller stores third non-updated data in said third memory and stores third backup data in a one of said first memory and said second memory, wherein said third backup data is backup data for said third non-updated data.

38. The apparatus as claimed in claim 37, wherein said controller stores said third backup data in said first memory, and
wherein, if said first memory suffers a failure, said controller copies said third non-updated memory to said second memory as copied third non-updated data.

39. The apparatus as claimed as claim 38, wherein said controller stores said second backup data in said third memory, and
wherein said controller stores first, second, and third clean data in said first, second, and third memories, respectively, wherein said first, second, and third clean data correspond to data stored on a disk.

40. The apparatus as claimed in claim 39, wherein said copied first backup data is used as backup data for said first backup data and wherein said copied third non-updated data is used as backup data for said third non-updated data.

41. An apparatus, comprising:
a cache having a first memory, a second memory, a third memory, and a fourth memory;
a controller that stores first non-updated data in said first memory and stores first backup data in said third memory,
wherein said first backup data is backup data for said first non-updated data, and
wherein, if said first memory suffers a failure, said controller copies said first backup data to said fourth memory as copied first backup data.

42. The apparatus as claimed in claim 41, wherein said controller stores second non-updated data in said second memory and stores second backup data in said fourth memory, wherein said second backup data is backup data for said second non-updated data.

43. The apparatus as claimed in claim 42, wherein, if said second memory suffers a failure, said controller copies said second backup data to said third memory as copied second backup data.

44. The apparatus as claimed in claim 43, wherein said controller stores third non-updated data in said third memory and stores third backup data corresponding to said third non-updated data in said first memory, and wherein, if said first memory suffers a failure, said controller copies said third non-updated data to said fourth memory as copied third non-updated data.

45. The apparatus as claimed in claim 44, wherein said controller stores fourth non-updated data in said fourth memory and stores fourth backup data corresponding to said fourth non-updated data in said second memory, and wherein, if said second memory suffers a failure, said controller copies said fourth non-updated data to said third memory as copied fourth non-updated data.

46. An apparatus, comprising:

a cache having at least three memories;

a disk apparatus; and a controller, wherein said controller specifies a logical number corresponding to a storage location in said disk apparatus where non-updated data is to be stored, calculates a memory number based on a remainder of the division: (logical number)/x, identifies a selected memory of said memories to which said memory number corresponds, and determines whether or not said selected memory is suffering a failure, wherein, if the selected memory is suffering a failure, said controller calculates a new memory number based on a remainder of the division: (logical number+y)/x, identifies a new selected memory of said memories to which said new memory number corresponds, stores said non-updated data in said new selected memory, calculates a backup memory number based on a remainder of the division: (new memory number+z)/x, identifies a backup memory of said memories to which said backup memory number corresponds, and stores backup data in said backup memory, wherein said backup data corresponds to said non-updated data, and wherein x, y, and z are integers.

47. The apparatus as claimed in claim 46, wherein said logical number designates a logical disk number.

48. The apparatus as claimed in claim 46, wherein said logical number is an access area where said non-updated data is to be stored, and wherein said access area has a predetermined size and is a segmented portion of memory space in said disk apparatus.

49. The apparatus as claimed in claim 46, wherein x equals a total number of said memories.

50. The apparatus as claimed in claim 49, wherein x equals three, y equals one, and z equals one.

51. The apparatus as claimed in claim 49, wherein x equals four, y equals two, and z equals one.

52. The apparatus as claimed in claim 49, wherein said controller determines if said backup memory is suffering from a failure before storing said backup data in said backup memory, wherein said controller only stores said backup data in said backup memory if said backup memory is not suffering from a failure, wherein, if said backup memory is suffering from a failure, said controller determines a new backup memory number based on a remainder of the division: (new memory number+a)/x, identifies a new backup memory of said memories to which said new backup memory number corresponds, and stores said backup data in said new backup memory, and wherein a is an integer.

53. The apparatus as claimed in claim 52, wherein x equals four, y equals two, z equals one, and a equals three.

54. An apparatus, comprising:

a cache having at least three memories; and a controller, wherein said controller determines whether or not one of said memories is suffering a failure, wherein, if a first memory of said memories is suffering a failure, said controller identifies a first memory number corresponding to said first memory, identifies a second memory number corresponding to a second memory of said memories based on a remainder of the division: (first memory number+y)/x, and identifies a third memory number corresponding to a third memory of said memories based on a remainder of the division: (first memory number+z)/x, wherein said second memory contains first backup data corresponding to first non-updated data stored in said first memory before said failure, wherein, if said first memory suffers a failure, said controller copies said first backup data in said second memory to said third memory as copied first backup data, and wherein x, y, and z are integers.

55. The apparatus as claimed in claim 54, wherein x equals three, y equals one, and z equals two.

56. The apparatus as claimed in claim 54, wherein said controller stores second non-updated data in said third memory, and wherein said controller copies said second non-updated data in said third memory to said second memory as copied second backup data.

57. The apparatus as claimed in claim 56, wherein said controller deems said first backup data to be new first non-updated data, deems said copied first backup data to be new first backup data for said new first non-updated data, and deems said copied second backup data to be new second backup data for said second non-updated data.

58. The apparatus as claimed in claim 54, wherein said controller determines if said third memory suffers a failure, and wherein, if said third memory is not suffering a failure, said controller copies said first backup data in said second memory to said third memory as said copied first backup data.

59. The apparatus as claimed in claim 58, wherein, if said third memory is suffering a failure, said controller identifies a fourth memory number corresponding to a fourth memory of said memories based on a remainder of the division: (first memory number+a)/x, and copies said first backup data in said second memory to said fourth memory as said copied first backup data, and wherein a is an integer.

60. The method as claimed in claim 59, wherein x equals four, y equals two, and z equals three, and a equals five.

* * * * *